(12) United States Patent
Zou et al.

(10) Patent No.: US 11,631,248 B2
(45) Date of Patent: Apr. 18, 2023

(54) VIDEO WATERMARK IDENTIFICATION METHOD AND APPARATUS, DEVICE, AND STORAGE MEDIUM

(71) Applicant: BIGO TECHNOLOGY PTE. LTD., Singapore (SG)

(72) Inventors: Yu Zou, Guangzhou (CN); Xuan Yang, Guangzhou (CN); Zhenqiang Liu, Guangzhou (CN); Yue Pan, Guangzhou (CN); Zhen Li, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 205 days.

(21) Appl. No.: 17/299,726

(22) PCT Filed: Dec. 3, 2019

(86) PCT No.: PCT/CN2019/122609
§ 371 (c)(1),
(2) Date: Jun. 3, 2021

(87) PCT Pub. No.: WO2020/114378
PCT Pub. Date: Jun. 11, 2020

(65) Prior Publication Data
US 2022/0019805 A1 Jan. 20, 2022

(30) Foreign Application Priority Data
Dec. 3, 2018 (CN) .......................... 201811465129.4

(51) Int. Cl.
*G06K 9/00* (2022.01)
*G06V 20/40* (2022.01)
(Continued)

(52) U.S. Cl.
CPC ............ *G06V 20/41* (2022.01); *G06F 18/214* (2023.01); *G06F 18/23* (2023.01);
(Continued)

(58) Field of Classification Search
None
See application file for complete search history.

(56) References Cited

U.S. PATENT DOCUMENTS

| | | | |
|---|---|---|---|
| 7,391,880 B2* | 6/2008 | Reed | H04N 21/4627 235/468 |
| 7,424,131 B2* | 9/2008 | Alattar | G06T 1/005 707/E17.112 |

(Continued)

FOREIGN PATENT DOCUMENTS

| | | |
|---|---|---|
| CN | 102402542 A | 4/2012 |
| CN | 104504642 A | 12/2014 |

(Continued)

OTHER PUBLICATIONS

Wang et al., "Content-based block watermarking against cumulative and temporal attack," 2005 IEEE International Conference on Multimedia and Expo, Amsterdam, Netherlands, 2005, pp. 4 pp.-, doi: 10.1109/ICME.2005.1521364. (Year: 2005).*

(Continued)

*Primary Examiner* — Feng Niu
(74) *Attorney, Agent, or Firm* — George McGuire

(57) ABSTRACT

Disclosed are a video watermark identification method and apparatus, device, and a storage medium. The method includes: each video frame of multiple video frames of a video is divided into multiple image blocks to obtain an image sequence corresponding to the each video frame; multiple image sequences corresponding to the multiple video frames are input to a target detection model to obtain a classification result of each image block, and a feature vector of the video is obtained according to all classification results of the multiple image blocks; and the feature vector of the video is input to a watermark identification model to obtain a watermark identification probability output by the watermark identification model, and the video containing a (Continued)

watermark is determining in a case where the watermark identification probability is greater than or equal to a probability threshold.

20 Claims, 7 Drawing Sheets

(51) Int. Cl.
*G06V 10/50* (2022.01)
*H04N 21/8358* (2011.01)
*G06F 18/23* (2023.01)
*G06F 18/214* (2023.01)
*G06F 18/2415* (2023.01)
*H04N 21/44* (2011.01)
*G06V 10/762* (2022.01)

(52) U.S. Cl.
CPC .......... *G06F 18/2415* (2023.01); *G06V 10/50* (2022.01); *G06V 20/46* (2022.01); *G06V 20/49* (2022.01); *H04N 21/44008* (2013.01); *H04N 21/8358* (2013.01); *G06V 10/762* (2022.01); *G06V 2201/07* (2022.01)

(56) References Cited

U.S. PATENT DOCUMENTS

| | | | | |
|---|---|---|---|---|
| 7,720,249 B2* | 5/2010 | Rhoads | ...................... | G07F 7/08 |
| | | | | 348/460 |
| 9,892,301 B1* | 2/2018 | Holub | ................ | G06F 18/2415 |
| 10,650,209 B2* | 5/2020 | Holub | ....................... | G06T 7/73 |
| 11,194,984 B2* | 12/2021 | Holub | .................... | G06V 10/44 |
| 2003/0128861 A1* | 7/2003 | Rhoads | .............. | H04N 1/00079 |
| | | | | 707/E17.112 |
| 2018/0295172 A1 | 10/2018 | Vikramaratne | | |
| 2018/0336386 A1* | 11/2018 | Holub | .................. | G06V 10/245 |
| 2020/0410186 A1* | 12/2020 | Holub | .................. | G06K 7/1443 |
| 2021/0157998 A1* | 5/2021 | Rodriguez | ........... | G07G 1/0054 |

FOREIGN PATENT DOCUMENTS

| | | |
|---|---|---|
| CN | 106096668 A | 8/2016 |
| CN | 106331746 A | 1/2017 |
| CN | 107808358 A | 3/2018 |
| CN | 107995500 A | 5/2018 |
| CN | 108650491 A | 10/2018 |
| CN | 108833974 A | 11/2018 |
| CN | 109598231 A | 12/2018 |

OTHER PUBLICATIONS

First Search of CN Prior Application, pp. 1-12.
International Search Report Form PCT/ISA/210, and Written Opinion Form PCT/ISA/237, International Application No. PCT/CN2019/122609 pp. 1-7 International Filing date Dec. 3, 2019 dated Mar. 2020.
Machine Translation—First CN Office Action of prior application, pp. 1-4.

* cited by examiner

VIDEO WATERMARK IDENTIFICATION METHOD AND APPARATUS, DEVICE, AND STORAGE MEDIUM

CROSS-REFERENCE TO RELATED APPLICATIONS

This is a National Stage Application filed under 35 U.S.C. 371 based on International Patent Application No. PCT/CN2019/122609, filed on Dec. 3, 2019, which claims priority to Chinese Patent Application No. 201811465129.4 filed on Dec. 3, 2018, the disclosures of both of which are incorporated herein by reference in their entireties.

TECHNICAL FIELD

Embodiments of the present application relate to identification technology, and for example to a video watermark identification method and apparatus, device, and a storage medium.

BACKGROUND

A watermark is an important mark for copyright protection, and with gradual improvement of user copyright consciousness, various watermarks are also widely applied. For example, embedding the watermark in a video may be understood as embedding the watermark in multiple pictures, since the video may be understood as being composed of at least two video frames, each of which may be regarded as a picture.

Due to the widespread use of the watermark, the identification of the watermark has also been the direction of research. However, because the watermark occupies a small proportion of the picture, and often appears in non-critical areas of the picture, such as the bottom (e.g., a lower left corner or a lower right corner) or the top (e.g., an upper left corner or an upper right corner) of the picture, great difficulty is brought to the identification of a video watermark, so that the identification accuracy of the video watermark is not high.

SUMMARY

Embodiments of the present application provide a video watermark identification method and apparatus, device, and a storage medium, so as to improve the identification accuracy of a video watermark.

An embodiment of the present application provides a video watermark identification method. This method includes: each video frame of multiple video frames of a video is divided into multiple image blocks to obtain an image sequence corresponding to the each video frame; multiple image sequences corresponding to the multiple video frames are input to a target detection model to obtain a classification result of each image block, and a feature vector of the video is obtained according to all classification results of the multiple image blocks; and the feature vector of the video is input to a watermark identification model to obtain a watermark identification probability output by the watermark identification model, and the video containing a watermark is determining in a case where the watermark identification probability is greater than or equal to a probability threshold.

An embodiment of the present application further provides a video watermark identification apparatus. This apparatus includes an image sequence acquisition module, a video feature vector acquisition module and a watermark identification result determination module.

The image sequence acquisition module is configured to divide each video frame of multiple video frames of a video into multiple image blocks to obtain an image sequence corresponding to the each video frame.

The video feature vector acquisition module is configured to input multiple image sequences corresponding to the multiple video frames to a target detection model to obtain a classification result of each image block of the multiple image blocks, and obtain a feature vector of the video according to all classification results of the multiple image blocks.

The watermark identification result determination module is configured to input the feature vector of the video to a watermark identification model to obtain a watermark identification probability output by the watermark identification model, and determine that the video contains a watermark in a case where the watermark identification probability is greater than or equal to a probability threshold.

An embodiment of the present application further provides a device. This device includes one or more processors and a memory configured to store one or more programs. The one or more programs, when executed by the one or more processors, cause the one or more processors to implement the method provided in the embodiments of the present application.

In a fourth aspect, an embodiment of the present application further provides a computer-readable storage medium. Computer programs are stored in the computer-readable storage medium. The programs, when executed by a processor, implement the method provided in the embodiments of the present application.

DETAILED DESCRIPTION

Figure 1:
FIG. 1 is a schematic diagram of a picture containing a watermark provided in an embodiment of the present application.

The present application will be described with reference to the accompanying drawings and embodiments below. The specific embodiments described herein are merely illustrative of the present application and not intended to limit the present application. For purposes of illustration, only some, but not all, of the structures related to the present application are shown in the drawings.

Since a watermark typically occupies a small proportion of a picture and often appears in non-critical areas of the picture, such as the bottom (e.g., a lower left corner or a lower right corner) or the top (e.g., an upper left corner or an upper right corner) of the picture. As shown in FIG. 1, a picture containing a watermark is shown, in FIG. 1, the watermark is located at the upper right corner of the picture, which brings great difficulty to the watermark identification, so that the identification accuracy of the watermark is not high. Since a video may be understood as being composed of at least two video frames, each of which may be regarded as a picture, the picture described herein may be a still picture, a moving picture, or a video frame in the video.

For the identification of a video watermark, the identification of the video watermark refers to determining whether the video contains the watermark, and correspondingly, an identification result of the video watermark contains two situations that the video contains the watermark and the video does not contain the watermark. Because the video is composed of multiple video frames, and positions of the watermark in the multiple video frames may be different, the watermark may be a same watermark or different watermarks, for example, a video is composed of three video frames, the three video frames are split according to a time sequence, the watermark in the first video frame is located at the upper right corner of the video frame, the watermark in the second video frame is located at the upper left corner of the video frame, and the watermark in the third video frame is located at the upper right corner of the video frame, so that an unfixed position of the watermark also increases the identification difficulty of the video watermark. Based on the above, in order to improve the identification accuracy of the video watermark, it may be considered to increase a proportion of the watermark in the video frames, and perform the watermark identification on each video frame, and on this basis, determine a watermark identification result of the video according to watermark identification results of at least two video frames. The foregoing will be described with reference to specific embodiments below.

Figure 3:
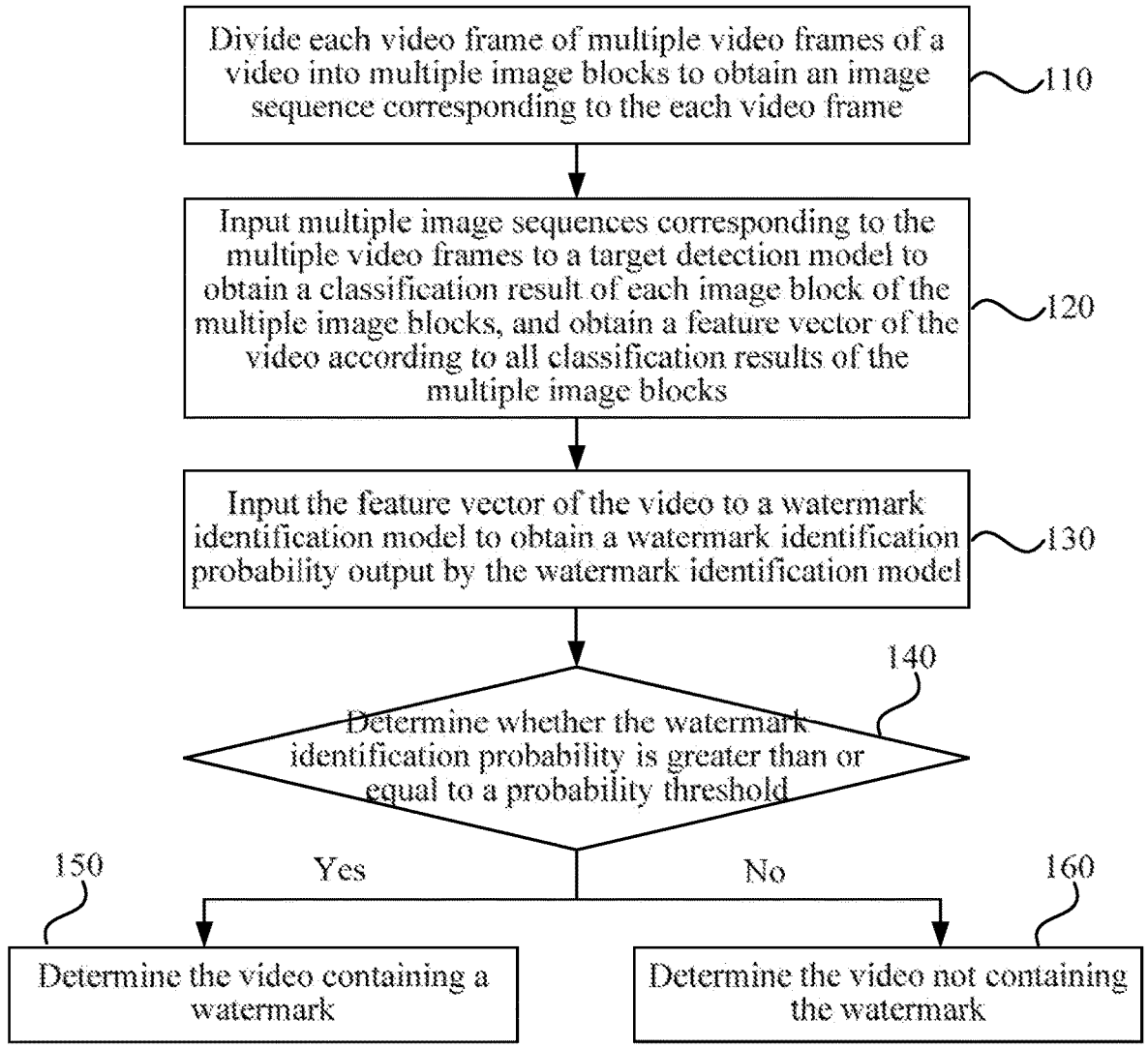
FIG. 3 is a flowchart of a video watermark identification method provided in an embodiment of the present application.

FIG. 3 is a flowchart of a video watermark identification method provided in an embodiment of the present application. This embodiment is applicable to a situation of improving the identification accuracy of a video watermark, the method may be performed by a video watermark identification apparatus, this apparatus may be implemented in a software and/or hardware manner, this apparatus may be configured in a device, for example, this apparatus is configured in a computer or a mobile terminal, etc. As shown in FIG. 3, the method includes following steps.

In step 110, each video frame of multiple video frames of a video is divided into multiple image blocks to obtain an image sequence corresponding to the each video frame.

In step 120, multiple image sequences corresponding to the multiple video frames are input to a target detection model to obtain a classification result of each image block of the multiple image blocks, and a feature vector of the video is obtained according to all classification results of the multiple image blocks.

In the embodiments of the present application, the video refers to a series of static pictures which are captured, recorded, processed, stored, transmitted and reproduced in an electric signal manner, when the change of continuous static pictures exceeds 24 frames of pictures per second, human eyes cannot distinguish a single static picture according to the vision persistence principle, the single static picture appears to be a smooth and continuous visual effect, and such continuous static pictures are called videos. In the embodiments of the present application, a still picture is referred to as the video frame.

As can be seen from the foregoing description, since a watermark typically occupies a small proportion of the video frame, and meanwhile, a position of the watermark in the video may not be fixed, whereby the identification difficulty of the video watermark is increased, therefore in order to improve the identification accuracy of the video watermark, a proportion of the watermark in the video frame may be considered to be increased, and a watermark identification is performed on each video frame, respectively.

The each video frame of the multiple video frames of the video is divided into the multiple image blocks, so that the proportion of the watermark in the video frame is increased, and the multiple image blocks of each video frame form an image sequence corresponding to the video frame. In an embodiment, the multiple image blocks of each video frame may be image blocks of equal height. For example, if a video V includes N video frames, then $V=\{I_1, I_2, \ldots, I_n, \ldots, I_{N-1}, I_N\}$, In represents a n-th video frame, $n \in \{1, 2, \ldots, N-1, N\}$; each video frame is divided into M image blocks, then $I_n=\{I_{n1}, I_{n2}, \ldots, I_{nm}, \ldots, I_{nM-1}, I_{nM}\}$, InM represents a m-th image block in the n-th video frame, $m \in \{1, 2, \ldots, M-1, M\}$, and In is an image sequence formed by multiple image blocks of the n-th video frame.

Figure 2:
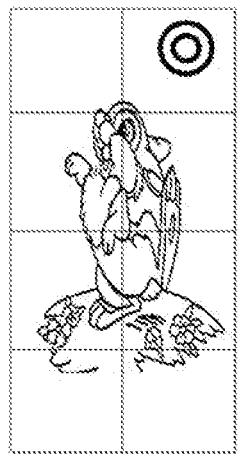
FIG. 2 is a schematic diagram of another picture containing a watermark provided in an embodiment of the present application.

FIG. 1 is taken as an example for illustration. For the video frame shown in FIG. 1, a size of the video frame is 256×128, the watermark is located at the upper right corner of the video frame, and a size of the watermark is 12×6, as shown in FIG. 2, the video frame is divided into 8 image blocks, a size of each image block is 64×64, and the 8 image blocks in FIG. 2 are referred as a first image block, a second image block, . . . , a seventh image block, and an eighth image block in the order from left to right and from top to bottom. Since the watermark is located in the upper right corner of the video frame, the watermark is present in a second image block, i.e. other image blocks do not contain the watermark, except for the second image block. Based on the above, before the video frame is not divided into 8 image blocks, the proportion of the watermark in the video frame is $$\frac{12*6}{256*64}*100\% = 0.44\%,$$

and after the video frame is divided into 8 image blocks, the proportion of the watermark in the second image block of the video frame is $$\frac{12*6}{64*64}*100\% = 1.76\%.$$

It can be seen that, the proportion of the watermark in the video frame may be increased through dividing each video frame in the video into the multiple image blocks.

The multiple image sequences respectively corresponding to the multiple video frames are input to a pre-trained target detection model, and the classification result of each image block is obtained through calculation of the target detection model. In an embodiment, the pre-trained target detection model may be generated by training a training sample based on a classifier model, and the training sample may include a training image, a classification category of the training image and a piece of position information of the training image. A common classifier model includes a Bayes decision, a maximum likelihood classifier, a Bayes classifier, a cluster analysis model, a neural network model, a support vector machine model, a chaotic and fractal model, a hidden Markov model, and the like. The classifier model may be set according to actual situations and is not limited here. The classification result may include a classification category of the image block, a classification probability of the image block, and a piece of position information of the image block. In an embodiment, the classification category may include a watermark and a background, and if the classification category is the watermark, it may represent that the image block contains the watermark; and if the classification category is background, it may represent that the image block does not contain the watermark.

Each image block may include multiple classification results, and a number of the classification results may be set according to actual situations and is not limited here. For example, each image block has T classification result, then a classification result of Inm as previously described may be represented as $B_{nm}=\{b_{nm1}, b_{nm2}, \ldots, b_{nmt}, \ldots, b_{nmT-1}, b_{nmT}\}$, bnmt represents a t-th classification result of the image block Inm, $t \in \{1, 2, \ldots, T-1, T\}$; $b_{nmt}=\{$id, conf, $x_{min}, y_{min}, x_{max}, y_{max}\}$, id represents a classification category in the t-th classification result of the image block Inm, conf represents a classification probability in the t-th classification result of the image block Inm, and $x_{min}, y_{min}, x_{max}, y_{max}$ represents a piece of position information of the image block Inm in the t-th classification result of the image block Inm. In an embodiment, (xmin, ymin) represents a piece of position information of the upper left corner of the image block Inm; Cxmax, ymax) represents a piece of position information of the lower right corner of the image block Inm. Based on the above, M×T classification results are obtained for a video frame In.

The step in which the feature vector of the video is obtained according to the all classification results of the multiple image blocks may include: a classification result of which the classification category is the watermark in multiple classification results of each image block is taken as an alternative classification result of this image block. Multiple feature vectors respectively corresponding to the multiple video frames are obtained according to alternative classification results of the all image blocks. A feature vector of the video is obtained according to the multiple feature vectors respectively corresponding to the multiple video frames. In this embodiment, the step in which the multiple feature vectors respectively corresponding to the multiple video frames are obtained according to the alternative classification results of the all image blocks may include following two manners.

In manner one, for each video frame, the alternative classification results of the multiple image blocks are sorted in a descending manner according to classification probabilities in the alternative classification results of the multiple image blocks in the video frame, and top U alternative results are selected to obtain a feature vector of this video frame. If the classification probabilities in the alternative results are the same, one alternative result may be randomly selected. In addition, if a number of alternative classification results in one image block is less than U, then a preset identification may be supplemented, and the preset identification described here may be −1. The purpose of the above operation is to keep dimensions of the feature vectors of the multiple video frames to be the same.

In manner two, for each video frame, the alternative classification results of each image block are sorted in a descending manner according to the classification probabilities in the alternative classification result of each image block in this frame video, and previous V alternative classification results in a sorting result of the alternative classification result of each image block are selected as a target classification result of the image block. The target classification results of the multiple image blocks are sorted in the descending manner according to the classification probabilities in target classification results of the multiple image blocks, and previous U target classification results are selected to obtain the feature vector of this video frame, $1<V<U$. Likewise, if the classification probabilities of the alternative classification results and/or the target classification results are the same, one of the alternative classification results and/or the target classification results may be randomly selected. Moreover, if a number of alternative classification results in one image block is less than V, then a preset identification may be supplemented; and/or if a number of target classification results in one image block is less than V, then the identification may also be supplemented, and the preset identification here may be −1. The purpose of the above operation is to keep dimensions of the feature vectors of the multiple video frames to be the same.

A difference between the two manners is that for a video frame, the manner one is that the all alternative results of the multiple image blocks are directly sorted in the descending manner according to the classification probabilities, the top U alternative results are selected to form the feature vector of the video frame, and the manner two is that the alternative classification results of each image block are screened for the first time to obtain the target classification result of each image block, the target classification results of the multiple image blocks are sorted in the descending manner according to the classification probabilities in the target classification results of the multiple image blocks, and top U target classification results are selected to form the feature vector of the video frame; that is, the manner one is that the feature vector of the video frame is determined through one-time screening, and the manner two is that the feature vector of the video frame is determined through two-time screening.

Since a first screening in the manner two does not sort the alternative classification results of the all image blocks but sorts the alternative classification results of each image block, which reduces the data processing difficulty compared with the manner one for sorting the alternative classification results of the all image blocks. Meanwhile, although the second screening in the manner two is to sort the target classification results of the all image blocks, the data processing amount is reduced through the first screening, and therefore compared with the manner one, the data processing difficulty is still reduced. Based on the above, when a number of frames of the video is large, the manner two may be adopted to reduce the data processing difficulty; and when a number of frames of the video is small, the manner one or the manner two may be adopted.

For the manner one, for each video frame, the alternative classification results of the multiple image blocks are sorted in the descending manner according to the classification probabilities, and the top U alternative results are selected to form the feature vector of the video frame. For example, for the video frame In in a video V, the video frame In is divided into M=4 image blocks, then $I_n=\{I_{n1}, I_{n2}, I_{n3}, I_{n4}\}$, each image block includes T=5 classification results, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n3}=\{b_{n31}, b_{n32}, b_{n33}, b_{n34}, b_{n35}\}$, and a classification result of In4 may be represented as $B_{n4}=\{b_{n41}, b_{n42}, b_{n43}, b_{n44}, b_{n45}\}$.

An alternative classification result of In1 is $B_{n1}'=\{b_{n11}, b_{n12}, b_{n13}\}$, and classification probabilities of the bn11, bn12 and bn13 are 0.9, 0.8 and 0.7, respectively; an alternative classification result of In2 is 0; an alternative classification result of In3 is $B_{n3}'=\{b_{n31}, b_{n33}, b_{n34}\}$, and classification probabilities of the bn31, bn33 and bn34 are 0.3, 0.4 and 0.2, respectively; and an alternative classification result of In4 is $B_{n4}'=\{b_{n42}, b_{n43}\}$, and classification probabilities of the bn42 and bn43 are 0.6 and 0.5, respectively.

All alternative classification results of the In1, In2, In3, and In4 are sorted in the descending manner according to the classification probabilities, with the sorting result being bn11, bn12, bn13, bn42, bn43, bn33, bn31, and bn34, and the top U=4 alternative classification results, i.e., bn11, bn12, bn13 and bn42 are selected to form the feature vector of the video frame, that is, $I_n=\{b_{n11}, b_{n12}, b_{n13}, b_{n42}\}$.

For the manner 2, for each video frame, firstly, the alternative classification results of the multiple image blocks are sorted in the descending manner according to the classification probabilities in the alternative classification results of the multiple image blocks, and top V alternative classification results in the sorting result of the alternative classification results of each image block are selected as the target classification result of the image block, namely, the alternative classification result of each image block is screened for the first time to obtain the target classification result of each image block. The target classification results of the multiple image blocks are sorted in the descending manner according to the classification probabilities in the target classification results of the multiple image blocks, and the top U target classification results are selected to form the feature vector of the video frame.

For example, for the video frame In in a video V, the video frame In is divided into M=4 image blocks, then $I_n=\{I_{n1}, I_{n2}, I_{n3}, I_{n4}\}$, each image block includes T=5 classification result, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n3}=\{b_{n31}, b_{n32}, b_{n33}, b_{n34}, b_{n35}\}$, and a classification result of In4 may be represented as $B_{n4}=\{b_{n41}, b_{n42}, b_{n43}, b_{n44}, b_{n45}\}$.

An alternative classification result of In1 is $B_{n1}'=\{b_{n11}, b_{n12}, b_{n13}\}$, and classification probabilities of the bn11, bn12 and bn13 are 0.9, 0.8 and 0.7, respectively; an alternative classification result of In2 is 0; an alternative classification result of In3 is $B_{n3}'=\{b_{n31}, b_{n33}, b_{n34}\}$, and classification probabilities of the bn31, bn33 and bn34 are 0.3, 0.4 and 0.2, respectively; and an alternative classification results of In4 is $B_{n4}'=\{b_{n42}, b_{n43}\}$, and classification probabilities of the bn42 and bn43 are 0.6 and 0.5, respectively.

For each image block, the top V=2 alternative classification results are selected as the target classification result of each image block. A target classification result of In1 is $B_{n1}''=\{b_{n11}, b_{n12}\}$, and classification probabilities of the bn11, bn12 are 0.9 and 0.8, respectively; a target classification result of In2 is 0; a target classification result of In3 is $B_{n3}''=\{b_{n31}, b_{n33}\}$, and classification probabilities of the bn31 and bn33 are 0.3 and 0.4, respectively; and a target classification result of In4 is $B_{n4}''=\{b_{n42}, b_{n43}\}$, and classification probabilities of the bn42 and bn43 are 0.6 and 0.5, respectively.

All alternative classification results of the In1, In2, In3, and In4 are sorted in the descending manner according to the classification probabilities, with the sorting result being bn11, bn12, bn42, bn43, bn33 and bn31, and the top U=4 target classification results, i.e., bn11, bn12, bn42 and bn43 are selected to form the feature vector of the video frame, i.e., $I_n=\{b_{n11}, b_{n12}, b_{n42}, b_{n43}\}$.

After the multiple feature vectors respectively corresponding to the multiple video frames are obtained, the feature vector of the video may be obtained according to the multiple feature vectors respectively corresponding to the multiple video frames. In this embodiment, the feature vector of the video is a vector set composed of the multiple feature vectors respectively corresponding to the multiple video frames. For example, if a video V includes N video frames, then $V=\{I_1, I_2, \ldots, I_n, \ldots, I_{N-1}, I_N\}$, In represents a n-th video frame, $n \in \{1, 2, \ldots, N-1, N\}$, and In may be determined in the manner previously described.

In step 130, the feature vector of the video is input to a watermark identification model to obtain a watermark identification probability output by the watermark identification model.

In step 140, whether the watermark identification probability being greater than or equal to a probability threshold is determined; if the watermark identification probability is greater than or equal to the probability threshold, then a step 150 is performed; if the watermark identification probability is less than or equal to the probability threshold, then a step 160 is performed.

In step 150, the video containing a watermark is determined.

In step 160, the video not containing the watermark is determined.

In the embodiments of the present application, the feature vector of the video is input to a pre-trained watermark identification model, and the watermark identification probability of the video is obtained through calculation of the watermark identification model. In an embodiment, the pre-trained watermark identification model may be generated by training a training sample based on an extreme gradient boosting (Xgboost) model, and the training sample may be a feature vector of the training video and a classification category of a training video.

If the watermark identification probability is greater than or equal to the probability threshold, then the video containing the watermark is determined; if the watermark identification probability is less than the probability threshold, then the video not containing the watermark is determined. In this embodiment, the probability threshold may be taken as a basis for determining whether the video contains the watermark, and a value of the probability threshold may be set according to actual situations without limitation and is not limited here. For example, the probability threshold is 0.9.

According to the technical scheme of this embodiment, the each video frame of the multiple video frames of the video is divided into the multiple image blocks to obtain the image sequence corresponding to the each video frame, the multiple image sequences corresponding to the multiple video frames are input to the target detection model to obtain the classification result of the each image block, and the feature vector of the video is obtained according to the all classification results of the multiple image blocks, the feature vector of the video is input to the watermark identification model to obtain the watermark identification probability output by the watermark identification model, in a case where the watermark identification probability is greater than or equal to the probability threshold, the video containing the watermark is determined. The video frames are subjected to block processing to obtain the image blocks, so that the proportion of the watermark in the video frames is increased, the identification difficulty of the video watermark is reduced, and the watermark identification results corresponding to the multiple video frames are obtained by inputting the multiple image sequences respectively corresponding to the multiple video frames into the target detection model, and then the watermark identification results corresponding to the multiple video frames are input to the watermark identification model to obtain the watermark identification result of the video, and since the watermark identification results corresponding to the multiple video frames are utilized, when the position of the watermark is not fixed, whether the video contains the watermark may still be accurately identified, whereby the identification accuracy of the video watermark is improved.

On the basis of the above technical schemes, the step in which the feature vector of the video is obtained according to the all classification results of the multiple image blocks includes: a watermark classification result of the each image block is determined according to the multiple classification results of the each image block of the each video frame; a feature vector corresponding to the each video frame is obtained according to all watermark classification results of the multiple image blocks of the each video frame; and the feature vector of the video is obtained according to multiple feature vectors corresponding to the multiple video frames.

In the embodiments of the present application, the watermark classification result of the each video frame is determined according to the classification result of the each image block of the each video frame, which may be understood as follows: the classification result of the image block may include a classification category of the image block, a classification probability of the image block, and a piece of position information of the image block, where the classification category of the image block includes a watermark and a background, and the classification result with the classification category being the watermark may be referred to as the watermark classification result, and the classification result with the classification category being the background may be referred to as a background classification result. For each image block, since the classification result may be a watermark classification result or a background classification result, so as to determine whether the video contains the watermark, and thus, the watermark classification result may be considered as an effective classification result. Based on the above, the feature vector corresponding to each video frame is obtained according to the watermark classification results of the all image blocks, that is, the classification result of each image block being the watermark classification result is taken as the alternative classification result of the image block, and the feature vector corresponding to each video frame is obtained according to the alternative classification results of the all image blocks of each video frame.

The step in which the feature vector corresponding to the each video frame is obtained according to watermark classification results of the all image blocks of the each video frame may include following two manners:

In manner one, the watermark classification results of the multiple image blocks are sorted according to watermark containing probabilities of the multiple image blocks of the each video frame. The feature vector of the each video frame is determined from a sorting result corresponding to each video frame. Namely, for each video frame, the classification result of each image block being the watermark classification result is taken as the alternative classification result of each image block. The alternative classification results of the multiple image blocks are sorted in the descending manner according to the classification probabilities in the alternative classification results of the multiple image blocks, and the top U alternative results are selected to obtain the feature vector of the video frame.

In manner two, the watermark classification results of each image block are sorted according to the watermark containing probability of each image block of each video frame. Part of the watermark classification results are selected from the multiple sorting results corresponding to the each video frame, and the part of the watermark classification results are sorted. The feature vector of each video frame is determined from the part of the watermark classification results sorted corresponding to the each video frame. For each video frame, the classification result of each image block being the watermark classification result is taken as an alternative classification result of each image block. The alternative classification result of each image block are sorted in the descending manner according to the classification probabilities in the alternative classification results of each image block, and the top V alternative classification result are selected as the target classification result of the image block. The target classification results of the multiple image blocks are sorted in the descending manner according to the classification probabilities in the target classification results of the multiple image blocks, and the top U target classification results are selected to obtain the feature vector of the video frame, i.e., $1<V<U$.

On the basis of the above technical schemes, the step in which the feature vector corresponding to the each video frame is obtained according to the watermark classification results of the all image blocks of the each video frame may include: watermark classification results of the multiple image blocks of the each video frame are sorted according to watermark containing probabilities of the multiple image blocks of the each video frame; and the feature vector of the each video frame is determined from a sorting result corresponding to the each video frame.

In the embodiments of the present application, the step in which watermark classification results of the multiple image blocks are sorted according to watermark containing probabilities of the multiple image blocks of the each video frame, and the feature vector of the each video frame is determined from a sorting result corresponding to the each video frame may be understood as follows: the classification probability included in the watermark classification result of each image block is the watermark containing probability, the watermark classification results of the multiple image blocks are sorted in the descending manner according to the watermark containing probabilities of the multiple image blocks of each video frame, the top U sorting results are selected from the sorting results corresponding to each video frame, and the feature vector of each video frame is determined according to the top U sorting results.

For example, for the video frame In in a video V, the video frame In is divided into M=4 image blocks, then $I_n=\{I_{n1}, I_{n2}, I_{n3}, I_{n4}\}$, each image block includes T=5 classification result, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n3}=\{b_{n31}, b_{n32}, b_{n33}, b_{n4}, b_{n35}\}$, and a classification result of In4 may be represented as $B_{n4}=\{b_{n41}, b_{n42}, b_{n43}, b_{n44}, b_{n45}\}$.

A watermark classification result of In1 is $B_{n1}'=\{b_{n11}, b_{n12}, b_{n13}\}$, watermark containing probabilities of the bn11, bn12 and bn13 are 0.9, 0.8 and 0.7 respectively; a watermark classification result of In2 is 0; a watermark classification result of In3 is $B_{n3}'=\{b_{n31}, b_{n33}, b_{n34}\}$, watermark containing probabilities of the bn31, bn33 and bn34 are 0.3, 0.4 and 0.2, respectively; a watermark classification result of In4 is $B_{n4}'=\{b_{n42}, b_{n43}\}$, and watermark containing probabilities in the bn42 and bn43 are 0.6 and 0.5, respectively.

All watermark classification results of the In1, In2, In3, and In4 are sorted in the descending manner according to the watermark containing probability, with the sorting results being bn11, bn12, bn13, bn42, bn43, bn33, bn31, and bn34, and the top U=4 watermark classification results, i.e., bn11, bn12, bn13 and bn42 are selected to form the feature vector of the video frame, i.e., $I_n=\{b_{n11}, b_{n12}, b_{n13}, b_{n42}\}$.

On the basis of the above technical schemes, the step in which the feature vector corresponding to the each video frame is obtained according to the watermark classification results of the all image blocks of the each video frame may include: the watermark classification results of each image block are sorted according to the watermark containing probability of each image block of the each video frame; part of the watermark classification results are selected from the multiple sorting results corresponding to the each video frame, and the part of the watermark classification results are sorted; and the feature vector of each video frame is determined from the part of the watermark classification results sorted corresponding to the each video frame.

In the embodiments of the present application, the steps in which the watermark classification results of the each image block are sorted according to the watermark containing probabilities of the each image block of the each video frame; part of the watermark classification results are selected from the multiple sorting results corresponding to the each video frame, and the part of the watermark classification results are sorted; and the feature vector of each video frame is determined from the part of the watermark classification results sorted corresponding to the each video frame may be understood as follows: a classification probability included in the watermark classification result of each image block is the watermark containing probability, the watermark classification results of each image block are sorted in the descending manner according to the watermark containing probability of each image block of each video frame, the top V watermark classification results are selected from the multiple sorting results as the target watermark classification results, then the target watermark classification results are sorted in the descending manner, the top U sorting results may be selected from the target watermark classification results, and the feature vector of the video frame is determined according to the top U sorting results.

For example, for the video frame In in a video V, the video frame In is divided into M=4 image blocks, then $I_n=\{I_{n1}, I_{n2}, I_{n3}, I_{n4}\}$, each image block includes T=5 classification results, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n32}=\{b_{n31}, b_{n32}, b_{n33}, b_{n34}, b_{n35}\}$, a classification result of In4 may be represented as $B_{n4}=\{b_{n41}, b_{n42}, b_{n43}, b_{n44}, b_{n45}\}$.

A watermark classification result of In1 is $B_{n1}'=\{b_{n11}, b_{n12}, b_{n13}\}$, watermark containing probabilities of the bn11, bn12 and bn13 are 0.9, 0.8 and 0.7, respectively; a watermark classification result of In2 is 0; a watermark classification result of In3 is $B_{n3}'=\{b_{n31}, b_{n33}, b_{n34}\}$, watermark containing probabilities of the bn31, bn33 and bn34 are 0.3, 0.4 and 0.2, respectively; and a watermark classification result of In4 is $B_{n4}'=\{b_{n42}, b_{n43}\}$, watermark containing probability of the bn42 and bn43 are 0.6 and 0.5, respectively.

For each image block, the top V=2 watermark classification results are selected as the target watermark classification result of this image block. A target watermark classification result of In1 is $B_{n1}''=\{b_{n11}, b_{n12}\}$, watermark containing probabilities of the bn11 and bn12 are 0.9 and 0.8, respectively; a target watermark classification result of In2 is 0; a target watermark classification result of In3 is $B_{n3}''=\{b_{n31}, b_{n33}\}$, watermark containing probabilities of the bn31 and bn33 are 0.3 and 0.4, respectively; a target watermark classification result of In4 is $B_{n4}'=\{b_{n42}, b_{n43}\}$, watermark containing probabilities of the bn42 and bn43 are 0.6 and 0.5, respectively.

All target watermark classification results of the In1, In2, In3, and In4 are sorted in the descending manner according to the classification probabilities, with the sorting results being bn11, bn12, bn42, bn43, bn33 and bn31, and the top U=4 target watermark classification results, i.e., bn11, bn12, bn42 and bn43 are selected to form the feature vector of the video frame, i.e., $I_n=\{b_{n11}, b_{n12}, b_{n42}, b_{n43}\}$.

On the basis of the above technical schemes, a target detection model may be trained in following manner: a first training sample is acquired, where the first training sample includes multiple training images, classification categories of the multiple training images, and pieces of position information of the multiple training images; each training image of the multiple training images is divided into multiple first training image blocks, a classification category of each first training image block of each training image is obtained according to a classification category of the each training image, and a piece of position information of the each first training image block of the each training image is obtained according to a piece of position information of the each training image; and all the multiple first training image blocks are taken as an input variable, all classification categories of the multiple first training image blocks and all pieces of position information of the multiple first training image blocks are taken as an output variable, and a classifier model is trained to obtain the target detection model.

In the embodiments of the present application, the target detection model may be trained in following manner: a first training sample is acquired, where the first training sample may include multiple training images, classification categories of the multiple training images, and pieces of position information of the multiple training images; each training image of the multiple training images is divided into multiple first training image blocks, a classification category of each first training image block of the each training image is obtained according to a classification category of the each training image, and a piece of position information of the each first training image block of the each training image is obtained according to a piece of position information of the each training image. In an embodiment, the training image may include a picture containing a watermark, and may also include a picture that does not contain a watermark (i.e., a background picture), and the background picture described herein may be a picture containing subtitles. Correspondingly, the classification category of the training image may include the watermark and the background.

The step in which the classification category of the each first training image block of the each training image is obtained according to the classification category of the each training image, and the piece of position information of the each first training image block of the each training image is obtained according to the piece of position information of the each training image may be understood as follows: the classification category of each first training image block of each training image may be marked according to the classification category of each training image, and the piece of position information of each first training image block of each training image may be marked according to the piece of position information of each training image. For example, if the classification category of a training image is known to be the watermark and the piece of position information of the training image is known, then after the training image is divided into multiple first training image blocks, the classification category of the first training image block with the watermark is marked as the watermark, and the classification category of the first training image block without the watermark is marked as the background, and the piece of position information of each first training image block is marked according to the piece of position information of the training image.

The step in which the all the multiple first training image blocks are taken as the input variable, the all the classification categories of the multiple first training image blocks and the all pieces of position information of the multiple first training image blocks are taken as the output variable, and the classifier model is trained to obtain the target detection model may be understood as follows: the classifier model may include a support vector machine model or a neural network model, and the like. In this embodiment, the neural network model is a mathematical model which is based on the basic principle of neural networks in biology, simulates the processing mechanism of the neural system of the human brain to complex information by using network topology knowledge as the theoretical basis after understanding and abstracting the structure of the human brain and the response mechanism of external stimuli. This model realizes information processing by adjusting the weight of interconnection among a large number of internal nodes (neurons) depending on the complexity of the system. The neural network model may include a convolutional neural network model, a recurrent neural network model and a deep neural network model, the convolutional neural network model is taken as an example for explanation below, a core problem solved by the convolutional neural network model is how to automatically extract and abstract features, and then the features are mapped to a task target to solve an actual problem. A convolutional neural network generally consists of following three parts: a first part is an input layer, a second part consists of a combination of a convolutional layer, an activation layer and a pooling layer (or down sampling layer), and a third part consists of a fully-connected multi-layer perceptron classifier (i.e., fully-connected layer). The convolutional neural network model has a weight sharing characteristic, weight sharing refers to a convolution kernel, and a same feature of different positions of image data may be extracted through operation of one convolution kernel, in other words, the features of the same target at different positions in one image data are basically the same. Only a part of features may be obtained by using one convolution kernel, and the features of the picture may be extracted by using each convolution kernel to learn different features by setting multi-kernel convolution. In picture classification, a convolutional layer is used for extracting and analyzing low-level features into high-level features, the low-level features are basic features such as textures and edges, the high-level features such as shapes of human faces and objects may better represent attributes of samples, and this process is layering of the convolutional neural network model. The fully-connected layer functions as a "classifier" in the entire convolutional neural network. If operations such as the convolution layer, an excitation layer and the pooling layer are used for mapping original data to a hidden layer feature space, the fully-connected layer then serves to map the learned "distributed feature representation" to a sample mark space. In actual use, the fully-connected layer may be realized by a convolution operation: the fully-connected layer with a front layer being fully-connected may be converted into convolution with the convolution kernel being 1×1; the fully-connected layer with the front layer being the convolution layer may be converted into a global convolution with the convolution kernel being H×W, where H and W are a height and a width of the convolution result of the front layer, respectively.

A training process of the convolutional neural network model is a process of: calculating a loss function of the convolutional neural network model through forward propagation, calculating a partial derivative of the loss function to network parameters, and adopting a reverse gradient propagation method to adjust the network parameters of the convolutional neural network model, until the loss function of the convolutional neural network model reaches a preset function value. When the loss function value of the convolutional neural network model reaches the preset function value, it is indicated that the convolutional neural network model is trained, at this time, the network parameters of the convolutional neural network model are determined, and the trained convolutional neural network model may be taken as the target detection model. In this embodiment, the loss function is a function that maps an event or value of one or more variables into a real number that may intuitively represent a "cost" associated therewith, i.e., the loss function maps an event of one or more variables onto a real number associated with a cost. The loss function may be used for measuring model performance, which increases as a value of the loss function decreases, as well as inconsistencies between actual and predicted values. For the embodiments of the present application, a prediction value herein refers to the classification category of each first training image block and the piece of position information of each first training image block which are obtained by inputting the all first training image blocks as input variables into the convolutional neural network model; an actual value refers to an actual classification category of each first training image block and an actual piece of position information of each first training image block. In this embodiment, the loss function may be a cross-entropy loss function, a 0-1 loss function, a square loss function, an absolute loss function, a logarithmic loss function, and the like, and may be set according to actual situations and is not limited here.

The training images, such as the training images containing subtitles, which are easy to be mistakenly detected are added into the first training sample, and the classification category of the training images which are easy to be mistakenly detected is set as the background, so that the false detection rate of the target detection model is reduced, and further the prediction performance of the target detection model is improved.

On the basis of the above technical schemes, the step in which the all the multiple first training image blocks are taken as the input variable, the all the classification categories of the multiple first training image blocks and the all pieces of position information of the multiple first training image blocks are taken as the output variable, and the classifier model is trained to obtain the target detection model may include: a piece of size information of the each first training image block is acquired, a clustering analysis is performed on all pieces of size information of the multiple first training image blocks, and a prior frame of the each first training image block is determined; and the all the multiple first training image blocks and all prior frames of the multiple first training image blocks are taken as the input variable, the all classification categories of the multiple first training image blocks and the all pieces of position information of the multiple first training image blocks are taken as the output variable, the classifier model is trained to obtain the target detection model.

In the embodiments of the present application, in order to improve the prediction performance of the target detection model, after each training image is divided into multiple first training image blocks, the piece of size information of the each first training image block is acquired; and the clustering analysis is performed on the all pieces of size information of the multiple first training image blocks to determine the prior frame of the each first training image block, namely a corresponding prior frame is selected for each first training image block through the clustering analysis. A basic idea of the clustering analysis is to classify according to the similarity degree of multiple pattern features to be classified, the similar pattern features are classified into one class, and the dissimilar pattern features are taken as the other class. Simply stated, the similarity is that corresponding components in two feature vectors are respectively closer. The cluster analysis includes two basic contents, a measure of pattern similarity and a clustering algorithm.

The prior frames of the all first training image blocks are also taken as the input variable to participate in a process of training the classifier model, so that the prediction accuracy of the classifier model for predicting the piece of position information of each first training image block may be improved, and further the prediction performance of the target detection model is improved.

On the basis of the above technical schemes, the watermark identification model may be trained in following manners: a second training sample is acquired, where the second training sample includes a training video and a classification category of the training video; each training video frame of multiple training video frames of the training video is divided into multiple second training image blocks to obtain an image sequence corresponding to the each training video frame; and multiple image sequences corresponding to the multiple training video frames are input to the target detection model to obtain a classification result of each second training image block, and a feature vector of the training video is obtained according to all classification results of the multiple second training image blocks; and the feature vector of the training video is taken as an input variable, the classification category of the training video is taken as an output variable, and an XGBoost model is trained to obtain the watermark identification model.

In the embodiments of the present application, the XGBoost model is an improved version of a gradient boosting decision tree (GBDT) model, and a basic idea of the XGBoost model is to continuously reduce the residuals, so that previous model residuals are further reduced in a gradient direction, multiple basic learners are integrated to obtain a strong learner. A target function of the XGBoost model is a second-order Taylor expansion, and compared with a first-order Taylor expansion, the second-order Taylor expansion is wider in learning range and stronger in generalization ability, so that the stability of the model is higher, and meanwhile, a regularization item, a threshold value and a coefficient are added in the target function. The XGBoost model may effectively avoid the occurrence of over-fitting, the target function is optimized through L1 or L2 regularization, and meanwhile, a learning rate is added to be quickly converged to a value within a gradient range, so that the XGBoost model may find an optimal value; generation of a tree is limited by adding a threshold for pruning; a coefficient is added to smooth values of leaf nodes, and thus the over-fitting is prevented. The above shows that the XGBoost model as a novel improved decision tree model has advantages of being high in accuracy, high in operation speed, good in expandability, capable of extracting feature importance and the like, and the watermark identification accuracy may be improved in a case where a certain speed is guaranteed.

In an embodiment, the classification category of the training video is 1 or 0, where 1 represents the watermark and 0 represents the background, the watermark identification model may be obtained by training the XGBoost model with the feature vector of the training video as the input variable and the classification category of the training video as the output variable. In a process of using the watermark identification model, for an input video feature vector, the watermark identification probability corresponding to the feature vector of the video may be obtained, a range of the watermark identification probability is [0, 1], and the watermark identification probability is closer to 1, a probability that a watermark exists in a video corresponding to the input video feature vector is the higher.

The second training sample is acquired, where the second training sample includes the training video and the classification category of the training video; each training video frame of the multiple training video frames of the training video is divided into the multiple second training image blocks to obtain the image sequence corresponding to the each training video frame; and the multiple image sequences corresponding to the multiple training video frames are input to the target detection model to obtain the classification result of each second training image block, and the feature vector of the training video is obtained according to the all classification results of the multiple second training image blocks; and the feature vector of the training video is taken as the input variable, the classification category of the training video is taken as the output variable, and the XGBoost model is trained to obtain the watermark identification model.

On the basis of the above technical schemes, the step in which the feature vector of the training video is obtained according to the all classification results of the multiple second training image blocks may include: a watermark classification result of the each second training image block is determined according to the multiple classification results of the each second training image block of the each training video frame; a feature vector corresponding to the each training video frame is obtained according to all watermark classification results of the multiple second training image blocks of the each second training image block; and a feature vector of the training video is obtained according to multiple feature vectors corresponding to the multiple training video frames.

In the embodiments of the present application, the step in which the watermark classification result of each second training image block is determined according to the multiple classification results of the each second training image block of each training video frame may be understood as follows:

the classification result of the second training image block may include a classification category of the second training image block, a classification probability of the second training image block, and a piece of position information of the second training image block, the classification category of the second training image block includes a watermark and a background, and the classification result with the classification category being the watermark may be referred to as a watermark classification result, and the classification result with the classification category being the background may be referred to as a background classification result. For each second training image patch, since the classification result may be a watermark classification result or a background classification result, so as to determine whether the video contains the watermark, and thus, the watermark classification result may be considered as an effective classification result. Based on the above, the feature vector corresponding to the each training video frame is obtained according to the all watermark classification results of the multiple second training image blocks of the each training video frame, that is, the classification result of each second training image block being the watermark classification result is taken as the alternative classification result of the second training image block, and the feature vector corresponding to each training video frame is obtained according to the all alternative classification result of the multiple second training image blocks of the each training video frame.

The step in which the feature vector corresponding to each training video frame is obtained according to the all watermark classification results of the multiple second training image blocks of the each training video frame may include following two manners.

In manner one, the watermark classification results of the multiple second training image blocks are sorted according to watermark containing probabilities of the multiple second training image blocks of the each training video frame. The feature vector of each training video frame is determined from a sorting result corresponding to each training video frame. Namely, for each training video frame, the classification result of each second training image block being the watermark classification result is taken as the alternative classification result of each second training image block. The alternative classification results of the multiple second training image blocks are sorted in the descending manner according to the classification probabilities in the alternative classification results of the multiple second training image blocks, and the top U alternative results are selected to obtain the feature vector of the training video frame.

In manner two, the watermark classification results of each second training image block are sorted according to the watermark containing probability of each second training image block of each training video frame. Part of the watermark classification results are selected from the multiple sorting results corresponding to the each training video frame, and the part of the watermark classification results are sorted. The feature vector of each training video frame is determined from the part of the watermark classification results sorted corresponding to the each video frame. For each training video frame, the classification result of each second training image block being the watermark classification result is taken as an alternative classification result of each second training image block. The alternative classification result of each second training image block are sorted in the descending manner according to the classification probabilities in the alternative classification result of each second training image block, and the top V alternative classification result are selected as the target classification result of the second training image block. The target classification results of the multiple second training image blocks are sorted in the descending manner according to the classification probabilities in the target classification results of the multiple second training image blocks, and the top U target classification results are selected to obtain the feature vector of the training video frame, i.e., 1<V<U.

On the basis of the above technical schemes, the step in which the feature vector corresponding to the each training video frame is obtained according to the all watermark classification results of the multiple second training image blocks of the each training video frame may include: watermark classification results of the multiple second training image blocks are sorted according to watermark containing probabilities of the multiple second training image blocks of the each training video frame; and the feature vector of the each training video frame is determined from a sorting result corresponding to the each training video frame.

In the embodiments of the present application, the step in which the watermark classification results of the multiple second training image blocks are sorted according to watermark containing probabilities of the multiple second training image blocks of the each training video frame, and the feature vector of the each training video frame is determined from the sorting result corresponding to the each training video frame may be understood as follows: the classification probability included in the watermark classification result of each second training image block is the watermark containing probability, and the watermark classification results of the multiple second training image blocks are sorted in the descending manner according to the watermark containing probabilities of the multiple second training image blocks of each training video frame, the top U sorting results may be selected from the sorting results corresponding to each training video frame, and the feature vector of each training video frame is determined according to the top U sorting result.

For example, for the training video frame In in a training video V, the training video frame In is divided into M=4 second training image blocks, then $I_n=\{I_{n1}, I_{n2}, I_{n3}, I_{n4}\}$, each second training image block includes T=5 classification results, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n3}=\{b_{n31}, b_{n32}, b_{n33}, b_{n34}, b_{n35}\}$, and a classification result of In4 may be represented as $B_{n4}=\{b_{n41}, b_{n42}, b_{n43}, b_{n44}, b_{n45}\}$.

A watermark classification result of In1 is $B_{n1}'=\{b_{n11}, b_{n12}, b_{n13}\}$, watermark containing probabilities of the bn11, bn12 and bn13 are 0.9, 0.8 and 0.7 respectively; a watermark classification result of In2 is 0; a watermark classification result of In3 is $B_{n3}'=\{b_{n31}, b_{n33}, b_{n34}\}$, watermark containing probabilities of the bn31, bn33 and bn34 are 0.3, 0.4 and 0.2, respectively; a watermark classification result of In4 is $B_{n4}'=\{b_{n42}, b_{n43}\}$, and watermark containing probabilities in the bn42 and bn43 are 0.6 and 0.5, respectively.

All watermark classification results of the In1, In2, In3, and In4 are sorted in the descending manner according to the watermark containing probability, with the sorting results being bn11, bn12, bn13, bn42, bn43, bn33, bn31, and bn34, and the top U=4 watermark classification results, i.e., bn11, bn12, bn13 and bn42 are selected to form the feature vector of the training video frame, i.e., $I_n=\{b_{n11}, b_{n12}, b_{n13}, b_{n42}\}$.

On the basis of the above technical schemes, the step in which the feature vector corresponding to each training video frame is obtained according to the all watermark classification results of the multiple second training image blocks of the each training video frame may include: the watermark classification results of each second training image block are sorted according to the watermark containing probability of each second training image block of each training video frame; part of the watermark classification results are selected from the multiple sorting results corresponding to the each training video frame, and the part of the watermark classification results are sorted; and the feature vector of each training video frame is determined from the part of the watermark classification results sorted corresponding to the each video frame.

In the embodiments of the present application, the steps in which the watermark classification results of each second training image block are sorted according to the watermark containing probability of each second training image block of each training video frame, part of watermark classification results are selected from the multiple sorting results corresponding to the each training video frame, and the part of watermark classification results are sorted, and the feature vector of a training video frame corresponding to each video frame is determined from the part of the watermark classification results sorted corresponding to the each video frame may be understood as follows: a classification probability included in the watermark classification result of each second training image block is the watermark containing probability; the watermark classification results of each second training image block are sorted in the descending manner according to the watermark containing probability of each second training image block of each training video frame, and the top V watermark classification results are selected from multiple sorting results corresponding to each training video frame as the target watermark classification result, then the target watermark classification results are sorted in the descending manner, the top U sorting results may be selected from the target watermark classification results, and the feature vector of the training video frame is determined according to the top U sorting results.

For example, for the training video frame In in a training video V, the training video frame In is divided into M=4 second training image blocks, then $I_n=\{I_{n1}, I_{n2}, I_{n3}, I_{n4}\}$, each second training image block includes T=5 classification results, then a classification result of In1 may be represented as $B_{n1}=\{b_{n11}, b_{n12}, b_{n13}, b_{n14}, b_{n15}\}$, a classification result of In2 may be represented as $B_{n2}=\{b_{n21}, b_{n22}, b_{n23}, b_{n24}, b_{n25}\}$, a classification result of In3 may be represented as $B_{n3}=\{b_{n31}, b_{n32}, b_{n34}, b_{n35}\}$, a classification result of In4 may be represented as $B_{n4}=\{b_{41}, b_{n42}, b_{n43}, b_{n44}, b_{n45}\}$.

A watermark classification result of In1 is $B_{n1}'=\{b_{n11}, b_{n12}, b_{n13}\}$, watermark containing probabilities of the bn11, bn12 and bn13 are 0.9, 0.8 and 0.7, respectively; a watermark classification result of In2 is 0; a watermark classification result of In3 is $B_{n3}'=\{b_{n31}, b_{n33}, b_{n34}\}$, watermark containing probabilities of the bn31, bn33 and bn34 are 0.3, 0.4 and 0.2, respectively; and a watermark classification result of In4 is $B_{n4}'=\{b_{n42}, b_{n43}\}$, watermark containing probability of the bn42 and bn43 are 0.6 and 0.5, respectively.

For each second training image block, the top V=2 watermark classification results are selected as the target watermark classification result of this second training image block. A target watermark classification result of In1 is $B_{n1}'=\{b_{n11}, b_{n12}\}$, watermark containing probabilities of the bn11 and bn12 are 0.9 and 0.8, respectively; a target watermark classification result of In2 is 0; a target watermark classification result of In3 is $B_{n3}'=\{b_{n31}, b_{n33}\}$, watermark containing probabilities of the bn31 and bn33 are 0.3 and 0.4, respectively; a target watermark classification result of In4 is $B_{n4}'=\{b_{n42}, b_{n43}\}$, watermark containing probabilities of the bn42 and bn43 are 0.6 and 0.5, respectively.

All target watermark classification results of the In1, In2, In3, and In4 are sorted in the descending manner according to the classification probabilities, with the sorting results being bn11, bn12, bn42, bn43, bn33 and bn31, and the top U=4 target watermark classification results, i.e., bn11, bn12, bn42 and bn43 are selected to form the feature vector of the video frame, i.e., $I_n=\{b_{n11}, b_{n12}, b_{n42}, b_{n43}\}$.

In the embodiments of the present application, the piece of position information of each image block may be acquired through one-hot encoding (or called one-bit effective encoding). The one-hot encoding encodes N states by using N-bit state registers, each state has an independent register bit, and at any time only one bit of the N states is valid.

Since the video is composed of at least two video frames, and each video frame is essentially a single picture, so that the idea of the technical schemes provided in the embodiments of the present application is also suitable for following situations: a watermark of a single picture is identified, the picture is divided into multiple image blocks to obtain an image sequence of the picture, the image sequence of the image is input to the target detection model to obtain a classification result of each image block, and a feature vector of the picture is obtained according to the classification results of the multiple image blocks, the feature vector of the picture is input to a picture watermark identification model to obtain a watermark identification probability output by the picture watermark identification model, and the picture containing a watermark is determined in a case where the watermark identification probability is greater than or equal to the probability threshold.

On the basis of the above technical schemes, the step in which the feature vector of the picture is obtained according to the classification results of the multiple image blocks may include: a watermark classification result of the each image block is determined according to the classification result of the each image block in the multiple image blocks of the image; and a picture feature vector is obtained according to the watermark classification result of the multiple image blocks.

On the basis of the above technical schemes, the step in which the picture feature vector is obtained according to the watermark classification result of the multiple image blocks may include: the watermark classification results of the multiple image blocks are sorted according to the watermark containing probabilities of the multiple image blocks; and the feature vector of the picture is determined from a sorting result.

On the basis of the above technical schemes, the picture watermark identification model may be trained in following manner: a third training sample is obtained, where the third training sample includes multiple first training images and classification categories of the multiple first training images; each first training image is divided into multiple third training image blocks to obtain an image sequence corresponding to each first training image; and multiple image sequences corresponding to the multiple first training images are input to the target detection model to obtain a classification result of each third training image block, and a first training image feature vector is obtained according to the classification results of the all third training image blocks; and the feature vector of the first training image is taken as an input variable, the classification category of the first training image is taken as an output variable, and an XGBoost model is trained to obtain the picture watermark identification model.

On the basis of the above technical schemes, the step in which the feature vector of the first training image is obtained according to the classification results of the multiple third training image blocks may include: the watermark classification result of each third training image block is determined according to the multiple classification results of each third training image block of each first training image; and the feature vector corresponding to each first training image is obtained according to the watermark classification results of all third training image blocks of each first training image.

On the basis of the above technical schemes, the step in which the feature vector corresponding to each first training image is obtained according to the watermark classification results of all third training image blocks of each first training image may include: the watermark classification results of the multiple third training image blocks are sorted according to watermark containing probabilities of the multiple third training image blocks of the each first training image; and the feature vector of each first training image is determined from the sorting result corresponding to each first training image.

Figure 4:
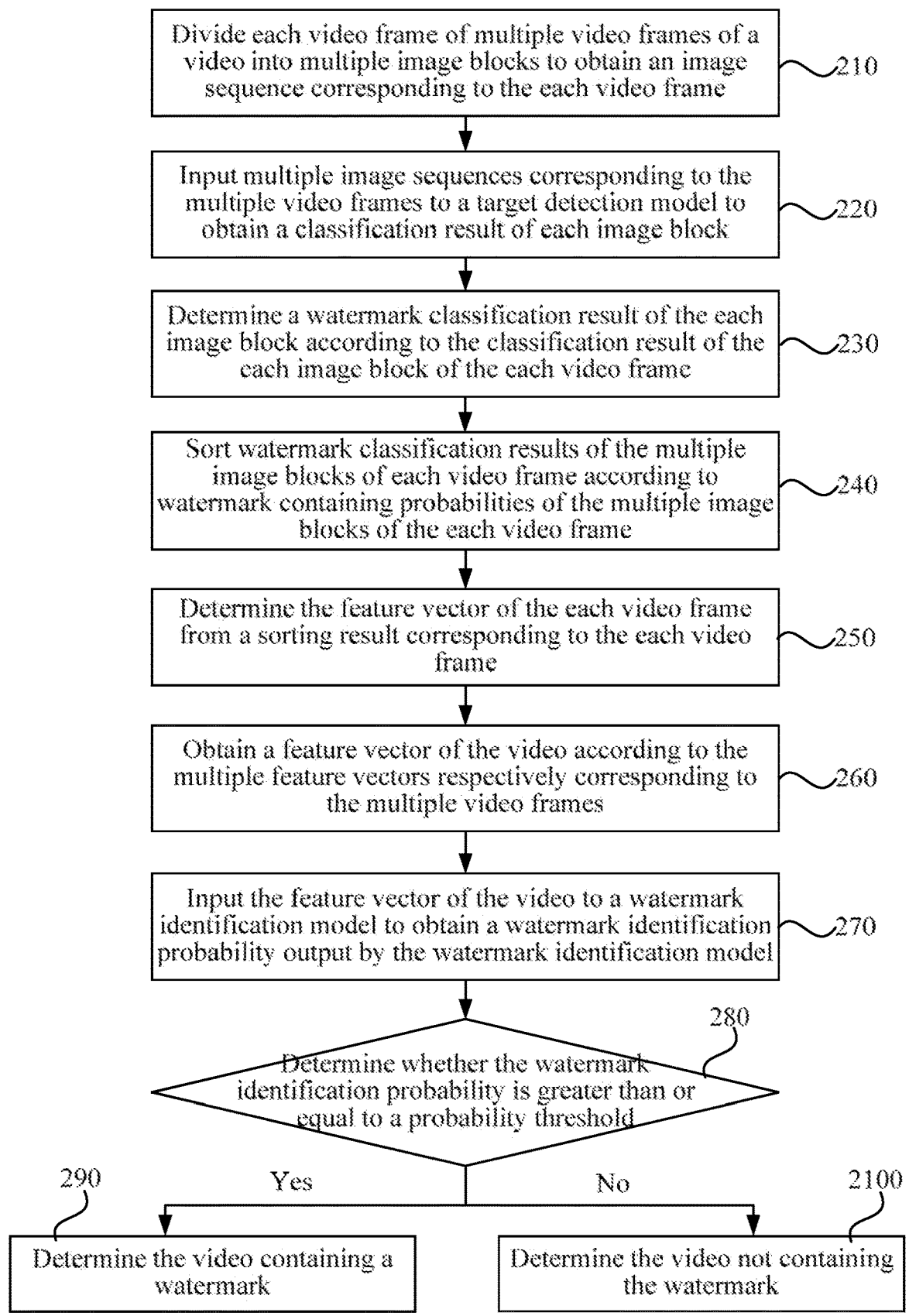
FIG. 4 is a flowchart of another video watermark identification method provided in an embodiment of the present application.

FIG. 4 is a flowchart of another video watermark identification method provided in an embodiment of the present application. This embodiment is applicable to a situation of improving the identification accuracy of a video watermark, the method may be performed by a video watermark identification apparatus, this apparatus may be implemented in a software and/or hardware manner, this apparatus may be configured in a device, for example, this apparatus is configured in a computer or a mobile terminal, etc. As shown in FIG. 4, the method includes following steps.

In step 210, each video frame of multiple video frames of a video is divided into multiple image blocks to obtain an image sequence corresponding to the each video frame.

In step 220, multiple image sequences corresponding to the multiple video frames are input to a target detection model to obtain a classification result of each image block.

In step 230, a watermark classification result of the each image block is determined according to the classification result of the each image block of the each video frame.

In an embodiment, the watermark classification result includes a watermark containing probability.

In step 240, watermark classification results of the multiple image blocks of each video frame are sorted according to watermark containing probabilities of the multiple image blocks of the each video frame.

In step 250, the feature vector of the each video frame is determined from a sorting result corresponding to the each video frame.

In step 260, a feature vector of the video is obtained according to the multiple feature vectors respectively corresponding to the multiple video frames.

In step 270, the feature vector of the video is input to a watermark identification model to obtain a watermark identification probability output by the watermark identification model.

In step 280, whether the watermark identification probability being greater than or equal to a probability threshold is determined; if the watermark identification probability is greater than or equal to the probability threshold, then a step 290 is performed; and if the watermark identification probability is less than the probability threshold, then a step 2100 is performed.

In step 290, the video containing a watermark is determined.

In step 2100, the video not containing the watermark is determined.

In the embodiments of the present application, in order to understand the technical schemes provided in the embodiments of the present application, following description is made by way of example.

Figure 5:
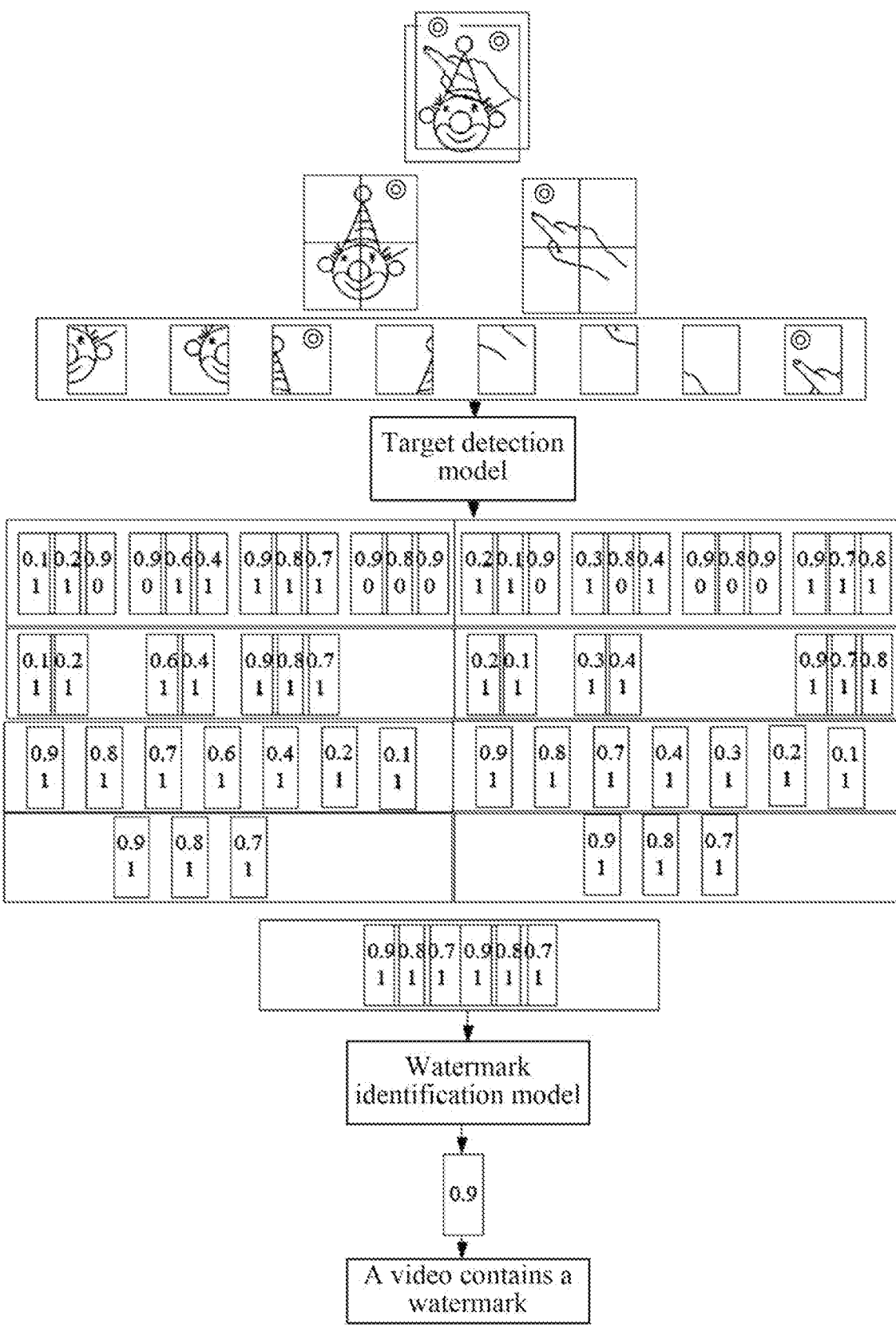
FIG. 5 is a schematic diagram of an application of a video watermark identification method provided in an embodiment of the present application.

As shown in FIG. 5, a schematic diagram of an application of a video watermark identification method is provided. In this embodiment, the probability threshold is set to 0.8. In FIG. 5, a video includes two video frames, each video frame is divided into 4 image blocks to obtain an image sequence of each video frame, two image sequences are input to a target detection model to obtain a classification result of each image block, each image block has three classification results, a watermark is represented by "1" and a background is represented by "0" in the classification results, a classification probability in the classification result is represented by a numerical value between 0 and 1, the watermark classification results of the 4 image blocks are sorted in a descending order according to watermark containing probabilities of the 4 image blocks of each video frame, top 3 watermark classification results are selected from sorting results to determine a feature vector of each video frame, a feature vector of the video is obtained according to feature vectors of the two video frames, and then the feature vector of the video is input to a watermark identification model to obtain a watermark identification probability of 0.9, since the watermark identification probability is greater than the probability threshold, the video containing the watermark is determined.

According to the technical scheme of this embodiment, the each video frame of the multiple video frames of the video is divided into the multiple image blocks to obtain the image sequence corresponding to the each video frame, the multiple image sequences corresponding to the multiple video frames are input to the target detection model to obtain the classification result of the each image block, and the feature vector of the video is obtained according to the all classification results of the multiple image blocks, the feature vector of the video is input to the watermark identification model to obtain the watermark identification probability output by the watermark identification model, in a case where the watermark identification probability is greater than or equal to the probability threshold, the video containing the watermark is determined. The video frames are subjected to block processing to obtain the image blocks, so that the proportion of the watermark in the video frames is increased, the identification difficulty of the video watermark is reduced, and the watermark identification results corresponding to the multiple video frames are obtained by inputting the multiple image sequences respectively corresponding to the multiple video frames into the target detection model, and then the watermark identification results corresponding to the multiple video frames are input to the watermark identification model to obtain the watermark identification result of the video, and since the watermark identification results corresponding to the multiple video frames are utilized, when the position of the watermark is not fixed, whether the video contains the watermark may still be accurately identified, whereby the identification accuracy of the video watermark is improved.

Figure 6:
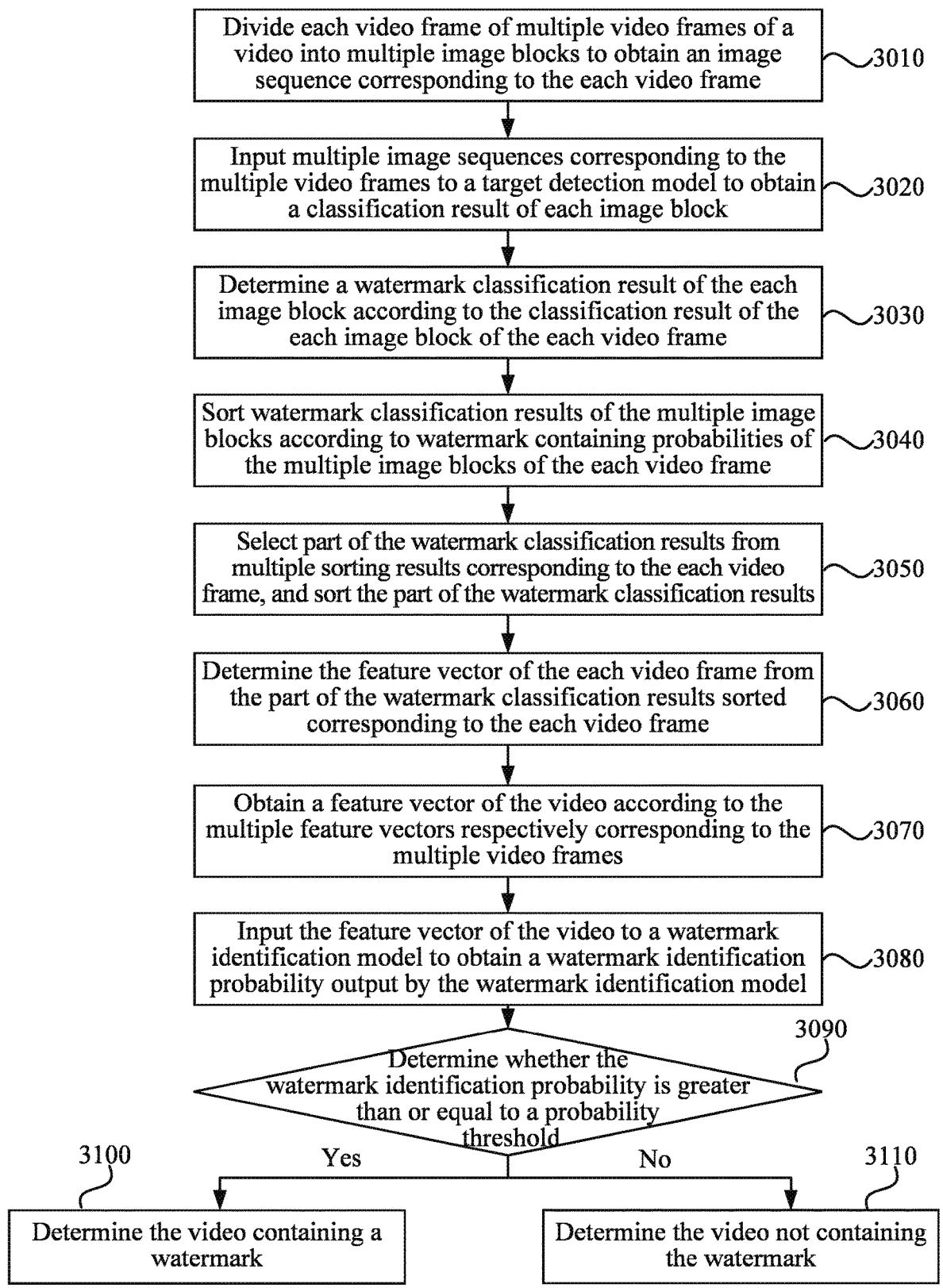
FIG. 6 is a flowchart of another video watermark identification method provided in an embodiment of the present application.

FIG. 6 is a flowchart of another video watermark identification method provided in an embodiment of the present application. This embodiment is applicable to a situation of improving the identification accuracy of a video watermark, the method may be performed by a video watermark identification apparatus, this apparatus may be implemented in a software and/or hardware manner, this apparatus may be configured in a device, for example, this apparatus is configured in a computer or a mobile terminal, etc. As shown in FIG. 6, the method includes following steps.

In step 3010, each video frame of multiple video frames of a video is divided into multiple image blocks to obtain an image sequence corresponding to the each video frame.

In step 3020, multiple image sequences corresponding to the multiple video frames are input to a target detection model to obtain a classification result of each image block.

In step 3030, a watermark classification result of the each image block is determined according to the classification result of the each image block of the each video frame.

In an embodiment, the watermark classification result includes a watermark containing probability.

In step 3040, watermark classification results of the multiple image blocks are sorted according to watermark containing probabilities of the multiple image blocks of the each video frame.

In step 3050, part of watermark classification results are selected from multiple sorting results corresponding to the each video frame, and the part of watermark classification results are sorted.

In step 3060, the feature vector of the each video frame is determined from the part of the watermark classification results sorted corresponding to the each video frame.

In step 3070, a feature vector of the video is obtained according to the multiple feature vectors respectively corresponding to the multiple video frames.

In step 3080, the feature vector of the video is input to a watermark identification model to obtain a watermark identification probability output by the watermark identification model.

In step 3090, whether the watermark identification probability being greater than or equal to a probability threshold is determined; if the watermark identification probability is greater than or equal to the probability threshold, then a step 3100 is performed; and if the watermark identification probability is less than the probability threshold, then a step 3110 is performed.

In step 3100, the video containing a watermark is determined.

In step 3110, the video not containing the watermark is determined.

In the embodiments of the present application, in order to understand the technical schemes provided in the embodiments of the present application, following description is made by way of example.

Figure 7:
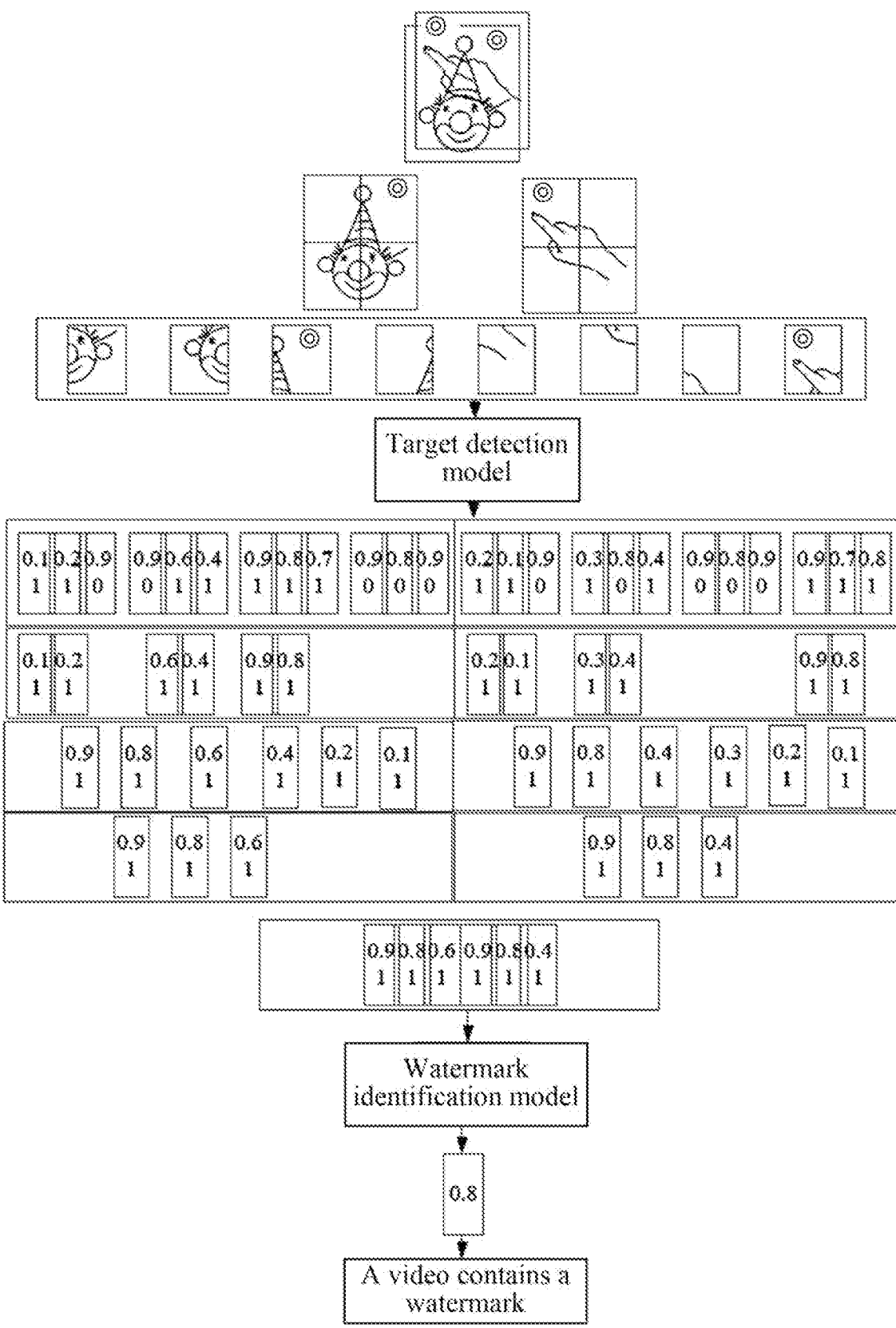
FIG. 7 is a schematic diagram of an application of another video watermark identification method provided in an embodiment of the present application.

As shown in FIG. 7, a schematic diagram of an application of another video watermark identification method is provided in FIG. 7. The probability threshold is set to 0.8. In FIG. 7, a video includes two video frames, each video frame is divided into 4 image blocks to obtain an image sequence of each video frame, two image sequences are input to a target detection model to obtain a classification result of each image block, each image block has three classification results, a watermark is represented by "1" and a background is represented by "0" in the classification results, a classification probability in the classification result is represented by a numerical value between 0 and 1, the watermark classification results of the 4 image blocks are sorted in a descending manner according to watermark containing probabilities of the 4 image blocks of each video frame, top 2 watermark classification results are selected from the 4 sorting results as target watermark classification results, and the 8 target watermark classification results are sorted in the descending manner, top 3 sorting results may be selected from the 8 target watermark classification results, the feature vector of each video frame is determined according to the top 3 sorting results, a feature vector of the video is obtained according to the feature vectors of the two video frames, the feature vector of the video is input to a watermark identification model to obtain a watermark identification model of 0.8, since the watermark identification probability is equal to the probability threshold, the video containing the watermark is determined.

According to the technical scheme of this embodiment, the each video frame of the multiple video frames of the video is divided into the multiple image blocks to obtain the image sequence corresponding to the each video frame, the multiple image sequences corresponding to the multiple video frames are input to the target detection model to obtain the classification result of the each image block, and the feature vector of the video is obtained according to the all classification results of the multiple image blocks, the feature vector of the video is input to the watermark identification model to obtain the watermark identification probability output by the watermark identification model, in a case where the watermark identification probability is greater than or equal to the probability threshold, the video containing the watermark is determined. The video frames are subjected to block processing to obtain the image blocks, so that the proportion of the watermark in the video frames is increased, the identification difficulty of the video watermark is reduced, and the watermark identification results corresponding to the multiple video frames are obtained by inputting the multiple image sequences respectively corresponding to the multiple video frames into the target detection model, and then the watermark identification results corresponding to the multiple video frames are input to the watermark identification model to obtain the watermark identification result of the video, and since the watermark identification results corresponding to the multiple video frames are utilized, when the position of the watermark is not fixed, whether the video contains the watermark may still be accurately identified, whereby the identification accuracy of the video watermark is improved.

Figure 8:
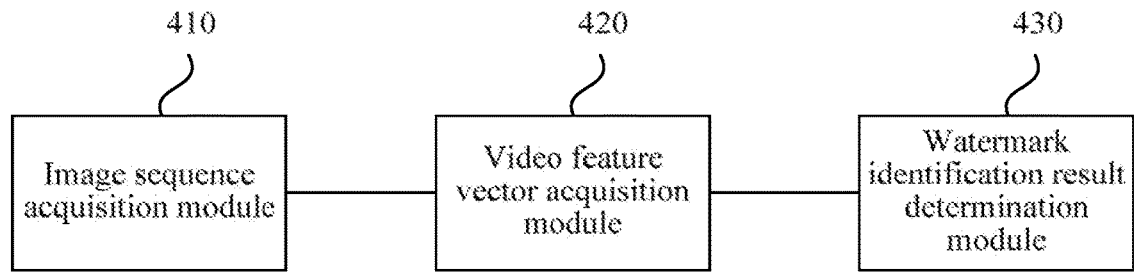
FIG. 8 is a schematic structural diagram of a video watermark identification apparatus provided in an embodiment of the present application.

FIG. 8 is a schematic structural diagram of a video watermark identification apparatus provided in an embodiment of the present application. This embodiment is applicable to a situation of improving the identification accuracy of a video watermark, this apparatus may be implemented in a software and/or hardware manner, this apparatus may be configured in a device, for example, this apparatus is configured in a computer or a mobile terminal, etc. As shown in FIG. 8, and the apparatus includes an image sequence acquisition module 410, a video feature vector acquisition module 420 and a watermark identification result determination module 430. The image sequence acquisition module 410 is configured to divide each video frame of multiple video frames of a video into multiple image blocks to obtain an image sequence corresponding to the each video frame. The video feature vector acquisition module 420 is configured to input multiple image sequences corresponding to multiple video frames to a target detection model to obtain a classification result of each image block of multiple image blocks, and obtain a feature vector of the video according to all classification results of the multiple image blocks. The watermark identification result determination module 430 is configured to input the feature vector of the video to a watermark identification model to obtain a watermark identification probability output by the watermark identification model, and determine that the video contains a watermark in a case where the watermark identification probability is greater than or equal to a probability threshold.

According to the technical scheme of this embodiment, the each video frame of the multiple video frames of the video is divided into the multiple image blocks to obtain the image sequence corresponding to the each video frame, the multiple image sequences corresponding to the multiple video frames are input to the target detection model to obtain the classification result of the each image block, and the feature vector of the video is obtained according to the all classification results of the multiple image blocks, the feature vector of the video is input to the watermark identification model to obtain the watermark identification probability output by the watermark identification model, in a case where the watermark identification probability is greater than or equal to the probability threshold, the video containing the watermark is determined. The video frames are subjected to block processing to obtain the image blocks, so that the proportion of the watermark in the video frames is increased, the identification difficulty of the video watermark is reduced, and the watermark identification results corresponding to the multiple video frames are obtained by inputting the multiple image sequences respectively corresponding to the multiple video frames into the target detection model, and then the watermark identification results corresponding to the multiple video frames are input to the watermark identification model to obtain the watermark identification result of the video, and since the watermark identification results corresponding to the multiple video frames are utilized, when the position of the watermark is not fixed, whether the video contains the watermark may still be accurately identified, whereby the identification accuracy of the video watermark is improved.

Figure 9:
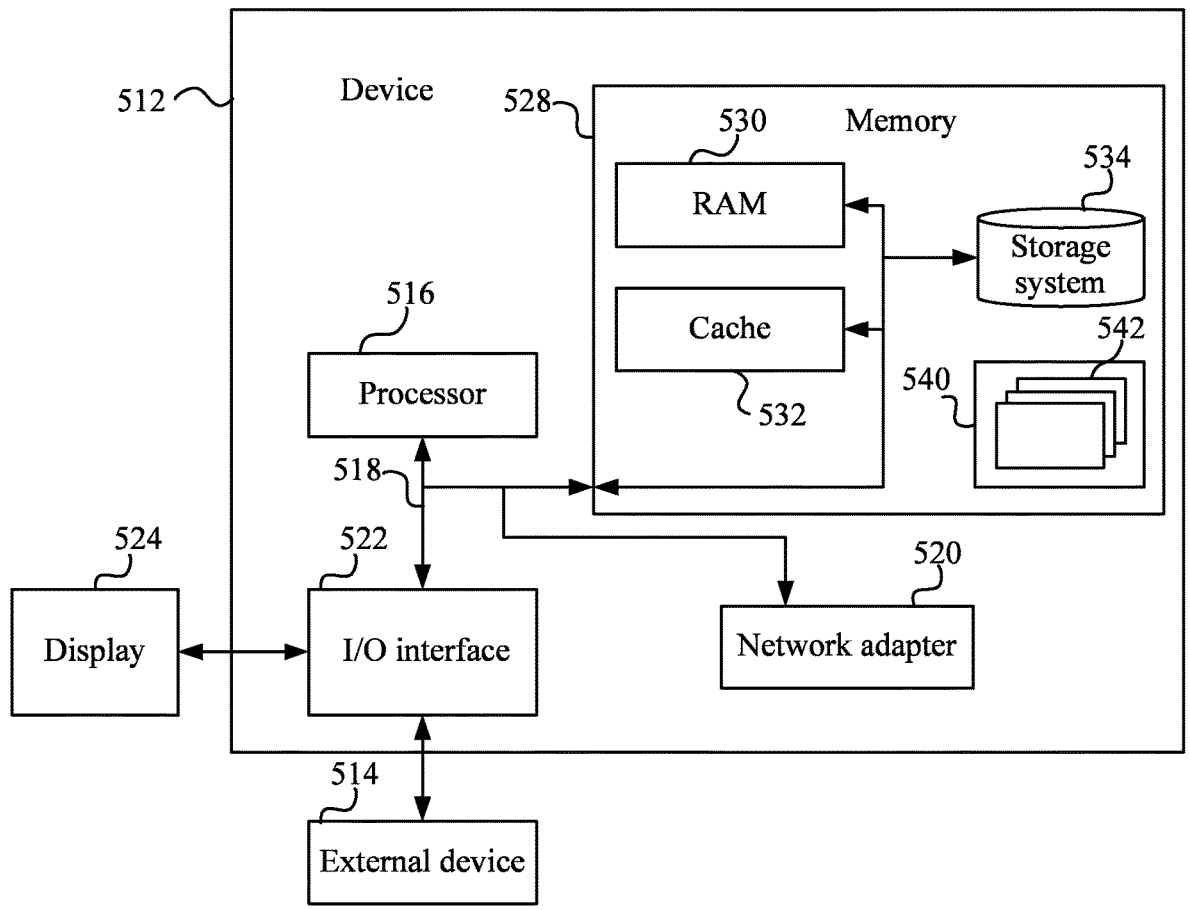
FIG. 9 is a schematic structural diagram of a device provided in an embodiment of the present application.

FIG. 9 is a schematic structural diagram of a device provided in an embodiment of the present application. FIG. 9 shows a block diagram of an example device 512 suitable for use in implementing the embodiments of the present application. The device 512 shown in FIG. 9 is merely an example and should not pose any limitation on the scope of use and functionality of the embodiments of the present application.

As shown in FIG. 9, the device 512 is embodied in a form of a general-purpose computing device. The components of the device 512 may include, but are not limited to, one or more processors 516, a system memory 528, and a bus 518 that connects various system assemblies (including the system memory 528 and the processor 516).

The processor 516 executes multiple functional applications and data processing by running programs stored in the system memory 528, for example, implements the video watermark identification method provided in the embodiments of the present application. This method includes: each video frame of multiple video frames of a video is divided into multiple image blocks to obtain an image sequence corresponding to the each video frame; multiple image sequences corresponding to the multiple video frames are input to a target detection model to obtain a classification result of each image block, and a feature vector of the video is obtained according to all classification results of the multiple image blocks; and the feature vector of the video is input to a watermark identification model to obtain a watermark identification probability output by the watermark identification model, and the video containing a watermark is determining in a case where the watermark identification probability is greater than or equal to a probability threshold.

An embodiment of the present application further provides a computer-readable storage medium. Computer programs are stored in the computer-readable storage medium, where the programs, when executed by a processor, implement the video watermark identification method as provided in the embodiments of the present application. This method includes: each video frame of multiple video frames of a video is divided into multiple image blocks to obtain an image sequence corresponding to the each video frame; multiple image sequences corresponding to the multiple video frames are input to a target detection model to obtain a classification result of each image block, and a feature vector of the video is obtained according to all classification results of the multiple image blocks; and the feature vector of the video is input to a watermark identification model to obtain a watermark identification probability output by the watermark identification model, and the video containing a watermark is determining in a case where the watermark identification probability is greater than or equal to a probability threshold.

What is claimed is:

1. A video watermark identification method, comprising:
dividing each video frame of a plurality of video frames of a video into a plurality of image blocks to obtain an image sequence corresponding to the each video frame;
inputting a plurality of image sequences corresponding to the plurality of video frames to a target detection model to obtain a classification result of each image block of the plurality of image blocks, and obtaining a feature vector of the video according to all classification results of the plurality of image blocks; and
inputting the feature vector of the video to a watermark identification model to obtain a watermark identification probability output by the watermark identification model, and determining that the video contains a watermark in a case where the watermark identification probability is greater than or equal to a probability threshold.

2. The method of claim 1, wherein the each image block has a plurality of classification results;
obtaining the feature vector of the video according to the all classification results of the plurality of image blocks comprises:
determining a watermark classification result of the each image block according to the plurality of classification results of the each image block of the each video frame;
obtaining a feature vector corresponding to the each video frame according to all watermark classification results of the plurality of image blocks of the each video frame; and
obtaining the feature vector of the video according to a plurality of feature vectors corresponding to the plurality of video frames.

3. The method of claim 2, wherein the watermark classification result comprises a watermark containing probability;
obtaining the feature vector corresponding to the each video frame according to the all watermark classification results of the plurality of image blocks of the each video frame comprises:
sorting watermark classification results of the plurality of image blocks of the each video frame according to watermark containing probabilities of the plurality of image blocks of the each video frame; and determining the feature vector of the each video frame from a sorting result corresponding to the each video frame.

4. The method of claim 2, wherein the watermark classification result comprises a watermark containing probability;
   obtaining the feature vector corresponding to the each video frame according to the all watermark classification results of the plurality of image blocks of the each video frame comprises:
      in a case where the each image block of the each video frame has a plurality of watermark classification results, sorting the plurality of watermark classification results of the each image block according to a plurality of watermark containing probabilities of the each image block of the each video frame;
      selecting part of the watermark classification results from watermark classification results of the plurality of image blocks of the each video frame according to a sorting result and sorting the part of the watermark classification results; and
      determining the feature vector of the each video frame from the part of the watermark classification results sorted corresponding to the each video frame.

5. The method of claim 1, wherein the target detection model is trained in following manners:
   acquiring a first training sample, wherein the first training sample comprises a plurality of training images, classification categories of the plurality of training images, and pieces of position information of the plurality of training images;
   dividing each training image of the plurality of training images into a plurality of first training image blocks, obtaining a classification category of each first training image block of the each training image according to a classification category of the each training image, and obtaining a piece of position information of the each first training image block of the each training image according to a piece of position information of the each training image; and
   taking all the plurality of first training image blocks as an input variable, taking all classification categories of the plurality of first training image blocks and all pieces of position information of the plurality of first training image blocks as an output variable, and training a classifier model to obtain the target detection model.

6. The method of claim 5, wherein taking the all the plurality of first training image blocks as the input variable, taking the all the classification categories of the plurality of first training image blocks and the all pieces of position information of the plurality of first training image blocks as the output variable, and training the classifier model to obtain the target detection model comprises:
   acquiring a piece of size information of the each first training image block;
   performing a clustering analysis on all pieces of size information of the plurality of first training image blocks, and determining a prior frame of the each first training image block; and
   taking the all the plurality of first training image blocks and all prior frames of the plurality of first training image blocks as the input variable, taking the all the classification categories of the plurality of first training image blocks and the all pieces of position information of the plurality of first training image blocks as the output variable, and training the classifier model to obtain the target detection model.

7. The method of claim 1, wherein the watermark identification model is trained in following manners:
   acquiring a second training sample, wherein the second training sample comprises a training video and a classification category of the training video;
   dividing each training video frame of a plurality of training video frames of the training video into a plurality of second training image blocks to obtain an image sequence corresponding to the each training video frame;
   inputting a plurality of image sequences corresponding to the plurality of training video frames into the target detection model to obtain a classification result of each second training image block of the plurality of second training image blocks, and obtaining a feature vector of the training video according to all classification results of the plurality of second training image blocks; and
   taking the feature vector of the training video as an input variable, taking the classification category of the training video as an output variable, and training an extreme gradient boosting (Xgboost) model to obtain the watermark identification model.

8. The method of claim 7, wherein the each second training image block has a plurality of classification results;
   obtaining the feature vector of the training video according to the all classification results of the plurality of second training image blocks comprises:
      determining a watermark classification result of the each second training image block according to the plurality of classification results of the each second training image block of the each training video frame;
      obtaining a feature vector corresponding to the each training video frame according to all watermark classification results of the plurality of second training image blocks of the each training video frame; and
      obtaining a feature vector of the training video according to a plurality of feature vectors corresponding to the plurality of training video frames.

9. The method of claim 8, wherein the watermark classification result comprises a watermark containing probability;
   obtaining the feature vector corresponding to the each training video frame according to the all watermark classification results of the plurality of second training image blocks of the each training video frame comprises:
      sorting watermark classification results of the plurality of second training image blocks of the each training video frame according to watermark containing probabilities of the plurality of second training image blocks of the each training video frame; and
      determining the feature vector of the each training video frame from a sorting result corresponding to the each training video frame.

10. The method of claim 8, wherein the watermark classification result comprises a watermark containing probability;
    obtaining the feature vector corresponding to the each training video frame according to the all watermark classification results of the plurality of second training image blocks of the each training video frame comprises:
       in a case where the each second training image block of the each training video frame has a plurality of watermark classification results, sorting the plurality of watermark classification results of the each second training image block according to a plurality of watermark containing probabilities of the each second training image block of the each training video frame;

selecting part of the watermark classification results from watermark classification results of the plurality of second training image blocks of the each training video frame according to a sorting result and sorting the part of the watermark classification results; and determining the feature vector of the each training video frame from the part of the watermark classification results sorted corresponding to the each training video frame.

11. A video watermark identification apparatus, comprising:

an image sequence acquisition module, which is configured to divide each video frame of a plurality of video frames of a video into a plurality of image blocks to obtain an image sequence corresponding to the each video frame;

a video feature vector acquisition module, which is configured to input a plurality of image sequences corresponding to the plurality of video frames to a target detection model to obtain a classification result of each image block of the plurality of image blocks, and obtain a feature vector of the video according to all classification results of the plurality of image blocks; and a watermark identification result determination module, which is configured to input the feature vector of the video to a watermark identification model to obtain a watermark identification probability output by the watermark identification model, and determine that the video contains a watermark in a case where the watermark identification probability is greater than or equal to a probability threshold.

12. A device, comprising:
at least one processor; and
a memory configured to store at least one program;
wherein the at least one program, when executed by the at least one processor, causes the at least one processor to implement the method of claim 1.

13. A non-transitory computer-readable storage medium, stored therein computer programs, wherein the computer programs, when executed by a processor, implement the method of claim 1.

14. The method of claim 2, wherein the target detection model is trained in following manners:

acquiring a first training sample, wherein the first training sample comprises a plurality of training images, classification categories of the plurality of training images, and pieces of position information of the plurality of training images;

dividing each training image of the plurality of training images into a plurality of first training image blocks, obtaining a classification category of each first training image block of the each training image according to a classification category of the each training image, and obtaining a piece of position information of the each first training image block of the each training image according to a piece of position information of the each training image; and taking all the plurality of first training image blocks as an input variable, taking all classification categories of the plurality of first training image blocks and all pieces of position information of the plurality of first training image blocks as an output variable, and training a classifier model to obtain the target detection model.

15. The method of claim 3, wherein the target detection model is trained in following manners:

acquiring a first training sample, wherein the first training sample comprises a plurality of training images, classification categories of the plurality of training images, and pieces of position information of the plurality of training images;

dividing each training image of the plurality of training images into a plurality of first training image blocks, obtaining a classification category of each first training image block of the each training image according to a classification category of the each training image, and obtaining a piece of position information of the each first training image block of the each training image according to a piece of position information of the each training image; and taking all the plurality of first training image blocks as an input variable, taking all classification categories of the plurality of first training image blocks and all pieces of position information of the plurality of first training image blocks as an output variable, and training a classifier model to obtain the target detection model.

16. The method of claim 4, wherein the target detection model is trained in following manners:

acquiring a first training sample, wherein the first training sample comprises a plurality of training images, classification categories of the plurality of training images, and pieces of position information of the plurality of training images;

dividing each training image of the plurality of training images into a plurality of first training image blocks, obtaining a classification category of each first training image block of the each training image according to a classification category of the each training image, and obtaining a piece of position information of the each first training image block of the each training image according to a piece of position information of the each training image; and taking all the plurality of first training image blocks as an input variable, taking all classification categories of the plurality of first training image blocks and all pieces of position information of the plurality of first training image blocks as an output variable, and training a classifier model to obtain the target detection model.

17. The method of claim 2, wherein the watermark identification model is trained in following manners:

acquiring a second training sample, wherein the second training sample comprises a training video and a classification category of the training video;

dividing each training video frame of a plurality of training video frames of the training video into a plurality of second training image blocks to obtain an image sequence corresponding to the each training video frame;

inputting a plurality of image sequences corresponding to the plurality of training video frames into the target detection model to obtain a classification result of each second training image block of the plurality of second training image blocks, and obtaining a feature vector of the training video according to all classification results of the plurality of second training image blocks; and taking the feature vector of the training video as an input variable, taking the classification category of the training video as an output variable, and training an extreme gradient boosting (Xgboost) model to obtain the watermark identification model.

18. The method of claim 3, wherein the watermark identification model is trained in following manners:
   acquiring a second training sample, wherein the second training sample comprises a training video and a classification category of the training video;
   dividing each training video frame of a plurality of training video frames of the training video into a plurality of second training image blocks to obtain an image sequence corresponding to the each training video frame;
   inputting a plurality of image sequences corresponding to the plurality of training video frames into the target detection model to obtain a classification result of each second training image block of the plurality of second training image blocks, and obtaining a feature vector of the training video according to all classification results of the plurality of second training image blocks; and
   taking the feature vector of the training video as an input variable, taking the classification category of the training video as an output variable, and training an extreme gradient boosting (Xgboost) model to obtain the watermark identification model.

19. The method of claim 4, wherein the watermark identification model is trained in following manners:
   acquiring a second training sample, wherein the second training sample comprises a training video and a classification category of the training video;
   dividing each training video frame of a plurality of training video frames of the training video into a plurality of second training image blocks to obtain an image sequence corresponding to the each training video frame;
   inputting a plurality of image sequences corresponding to the plurality of training video frames into the target detection model to obtain a classification result of each second training image block of the plurality of second training image blocks, and obtaining a feature vector of the training video according to all classification results of the plurality of second training image blocks; and
   taking the feature vector of the training video as an input variable, taking the classification category of the training video as an output variable, and training an extreme gradient boosting (Xgboost) model to obtain the watermark identification model.

20. The method of claim 5, wherein the watermark identification model is trained in following manners:
   acquiring a second training sample, wherein the second training sample comprises a training video and a classification category of the training video;
   dividing each training video frame of a plurality of training video frames of the training video into a plurality of second training image blocks to obtain an image sequence corresponding to the each training video frame;
   inputting a plurality of image sequences corresponding to the plurality of training video frames into the target detection model to obtain a classification result of each second training image block of the plurality of second training image blocks, and obtaining a feature vector of the training video according to all classification results of the plurality of second training image blocks; and
   taking the feature vector of the training video as an input variable, taking the classification category of the training video as an output variable, and training an extreme gradient boosting (Xgboost) model to obtain the watermark identification model.

* * * * *